US011268427B2

United States Patent
Lacher et al.

(10) Patent No.: US 11,268,427 B2
(45) Date of Patent: Mar. 8, 2022

(54) ASPIRATION SYSTEMS FOR WORK VEHICLES INCLUDING EXHAUST TUBES HAVING AIRFLOW AREA MODIFIERS

(71) Applicant: CNH Industrial America LLC, New Holland, PA (US)

(72) Inventors: Jonathan Lacher, Fargo, ND (US); Derek Thomas Jennen, Moorhead, MN (US); James Patrick Boeshans, Hawley, MN (US); Paul Francis Wollmuth, Fargo, ND (US)

(73) Assignee: CNH Industrial America LLC, New Holland, PA (US)

( * ) Notice: Subject to any disclaimer, the term of this patent is extended or adjusted under 35 U.S.C. 154(b) by 122 days.

(21) Appl. No.: 16/737,299

(22) Filed: Jan. 8, 2020

(65) Prior Publication Data
US 2021/0207517 A1 Jul. 8, 2021

(51) Int. Cl.
*F01N 13/08* (2010.01)
*F02M 35/16* (2006.01)
*F01N 13/00* (2010.01)
*F02M 35/024* (2006.01)

(52) U.S. Cl.
CPC ........... *F01N 13/08* (2013.01); *F02M 35/164* (2013.01); *F01N 13/009* (2014.06); *F01N 2240/20* (2013.01); *F01N 2470/30* (2013.01); *F01N 2590/08* (2013.01); *F02M 35/024* (2013.01)

(58) Field of Classification Search
CPC ........ F01N 2240/36; F01N 1/165; F01N 3/30; F01N 3/22
See application file for complete search history.

(56) References Cited

U.S. PATENT DOCUMENTS

| 2,506,810 | A | * | 5/1950 | Ospina-Racines | ...... F02D 15/00 123/1 R |
| 3,543,510 | A | * | 12/1970 | Kaufmann, Jr. | ......... F01N 3/34 60/308 |
| 3,598,540 | A | * | 8/1971 | Chase | .................. F01N 3/2846 422/177 |
| 3,657,878 | A | * | 4/1972 | Kaufmann, Jr. | ......... F01N 3/34 60/308 |
| 3,741,179 | A | * | 6/1973 | Vartanian | ............... F02M 26/55 123/676 |

(Continued)

FOREIGN PATENT DOCUMENTS

WO    WO2009/099399 A1    8/2009

*Primary Examiner* — Anthony Ayala Delgado
(74) *Attorney, Agent, or Firm* — Rickard K. DeMille; Rebecca L. Henkel

(57) ABSTRACT

In one aspect, an aspiration system for a work vehicle includes an exhaust tube extending along a flow direction and an aspiration tube in flow communication with the exhaust tube at an aspiration zone of the exhaust tube such that the aspiration tube is configured to receive an aspirated airflow. The system also includes an airflow area modifier provided in operative association with the aspiration zone and actuatable to adjust a cross-sectional flow area of the exhaust tube within the aspiration zone. The system includes an actuator provided in operative association with the airflow area modifier such that the actuator is configured to alter an orientation of the airflow area modifier such that the cross-sectional flow area of the exhaust tube within the aspiration zone is adjusted.

16 Claims, 7 Drawing Sheets

(56) References Cited

U.S. PATENT DOCUMENTS

| | | | | |
|---|---|---|---|---|
| 3,894,563 | A | * | 7/1975 | Pausch .................... B01D 47/10 138/45 |
| 4,026,682 | A | * | 5/1977 | Pausch .................... B01D 47/10 138/45 |
| 4,142,493 | A | * | 3/1979 | Schira ................. F02D 41/0077 123/568.21 |
| 4,178,760 | A | * | 12/1979 | Alf ............................ F01N 5/04 60/319 |
| 5,676,173 | A | | 10/1997 | Conrad et al. |
| 7,040,305 | B2 | * | 5/2006 | Sponton ................... F02D 21/08 123/568.18 |
| 7,261,096 | B2 | * | 8/2007 | Berggren .................. F02D 9/12 123/568.17 |
| 7,281,530 | B2 | * | 10/2007 | Usui ................ F02M 35/10222 123/568.11 |
| 7,878,171 | B2 | | 2/2011 | Vandike et al. |
| 8,341,948 | B2 | * | 1/2013 | Freese, V ............. F01N 13/082 60/298 |
| 10,711,741 | B2 | * | 7/2020 | Singh ................... F02M 35/086 |
| 2004/0007220 | A1 | * | 1/2004 | Sponton ................... F02D 9/18 123/568.18 |
| 2008/0178592 | A1 | | 7/2008 | Bering |
| 2014/0366857 | A1 | * | 12/2014 | Kawamura ............. F01N 11/00 123/585 |
| 2015/0107242 | A1 | * | 4/2015 | Long .................... F01N 11/002 60/605.1 |

* cited by examiner

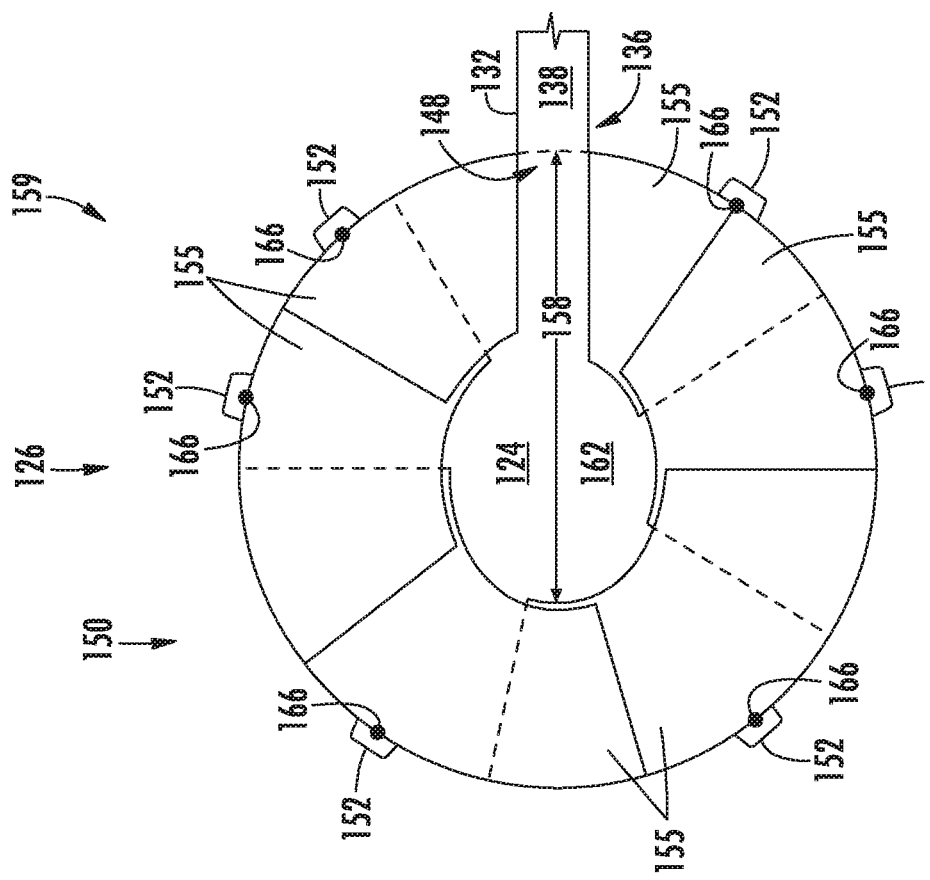
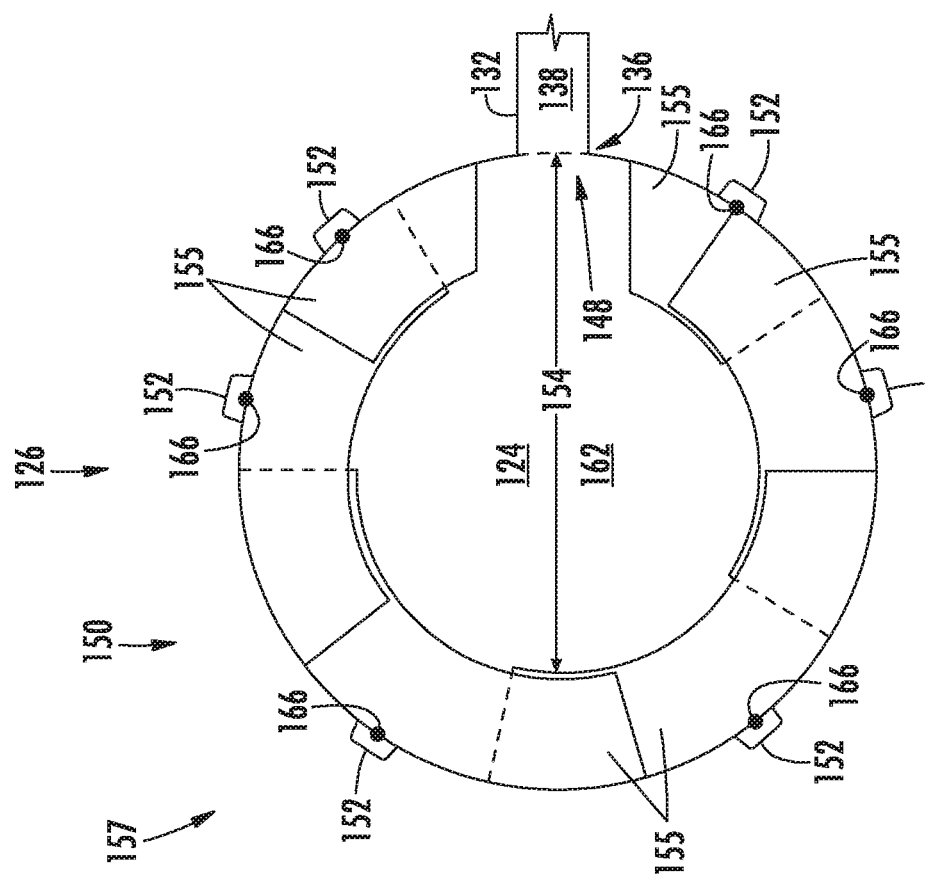

ASPIRATION SYSTEMS FOR WORK VEHICLES INCLUDING EXHAUST TUBES HAVING AIRFLOW AREA MODIFIERS

FIELD

The present disclosure generally relates to work vehicles and, more particularly, to an aspiration system for work vehicles including an exhaust tube having an airflow area modifier actuatable to adjust a cross-sectional flow area of the exhaust tube within an aspiration zone to maintain a proper aspirated airflow through an associated aspiration tube of the work vehicle.

BACKGROUND

Work vehicles typically include internal combustion engines that require clean air for use within the combustion process. Since many work vehicles, such as tractors, harvesters, and other agricultural work vehicles, operate in fields and other harvesting environments in which the ambient air contains large amounts of dust, plant matter, debris, particulates, and other particles, an air intake system providing effective air filtration is required. As such, air intake systems typically include a pre-cleaner positioned upstream of an air filter. In general, the pre-cleaner is configured to remove larger particles from the air entering the engine, while the air filter is configured to remove smaller particles that pass through the pre-cleaner.

To prevent the air filter from clogging, the large particulates separated from the intake air by the pre-cleaner must be removed from the pre-cleaner. Typically, the pre-cleaner is fluidly coupled to an aspiration or vacuum source, such as an exhaust tube of the work vehicle. As such, with exhaust gases flowing through the exhaust tube, a vacuum is created within the pre-cleaner, which draws particles out of the pre-cleaner. However, the vacuum pressure applied to the pre-cleaner by conventional configurations is often inadequate during certain operating conditions of the work vehicle, such as at an idle condition or low power output of an engine of the work vehicle. As such, the amount of particulates that can be removed from the incoming air by the pre-cleaner may be limited at such operating conditions, causing the air filter to plug within a short period of time.

Accordingly, an improved aspiration system for a work vehicle that provides greater aspiration or vacuum to the vehicle's air intake or filtration system at a wider range of operating conditions of the work vehicle would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to an aspiration system for a work vehicle. The system includes an exhaust tube extending along a flow direction from an upstream end to a downstream end. The exhaust tube defines an exhaust passage extending from the upstream end of the exhaust tube to the downstream end of the exhaust tube. The system further includes an aspiration tube in flow communication with the exhaust tube at an aspiration zone of the exhaust tube such that the aspiration tube is configured to receive an aspirated airflow. The system also includes an airflow area modifier provided in operative association with the aspiration zone of the exhaust tube. Further, the airflow area modifier is actuatable to adjust a cross-sectional flow area of the exhaust tube within the aspiration zone. Additionally, the system includes an actuator provided in operative association with the airflow area modifier such that the actuator is configured to alter an orientation of the airflow area modifier such that the cross-sectional flow area of the exhaust tube within the aspiration zone is adjusted.

In another aspect, the present subject matter is directed to a work vehicle. The work vehicle includes an engine and an air filtration system configured to filter air provided to the engine. The work vehicle also includes an exhaust tube extending along a flow direction from an upstream end to a downstream end. The exhaust tube defines an exhaust passage extending from the upstream end of the exhaust tube to the downstream end of the exhaust tube. The work vehicle further includes an aspiration tube fluidly coupled between the air filtration system and an aspiration zone of the exhaust tube such that the aspiration tube defines an aspiration passage extending between the air filtration system and the exhaust tube. The work vehicle also includes an airflow area modifier provided in operative association with the aspiration zone of the exhaust tube. Further, the airflow area modifier is actuatable to adjust a cross-sectional flow area of the exhaust tube within the aspiration zone. Additionally, the work vehicle includes an actuator provided in operative association with the airflow area modifier such that the actuator is configured to alter an orientation of the airflow area modifier such that the cross-sectional flow area of the exhaust tube within the aspiration zone is adjusted.

In a still further aspect, the present subject matter is directed to a method of aspirating an air filtration system of a work vehicle. The air filtration system includes an aspiration tube in fluid communication with an exhaust tube of the work vehicle at an aspiration zone of the exhaust tube. The method includes directing a flow of exhaust gases from an engine of the work vehicle through the exhaust tube. The method further includes generating an aspirated airflow through the aspiration tube as the exhaust gases flow through the aspiration zone to remove particulates from the air filtration system. Moreover, the exhaust tube defines a cross-sectional flow area at the aspiration zone. Additionally, the method includes actuating an airflow area modifier disposed within the exhaust tube at the aspiration zone to adjust the cross-sectional flow area of the exhaust tube at the aspiration zone in a manner that varies the aspirated airflow generated through the aspiration tube.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 6 illustrates a cross-sectional view of a further embodiment of an aspiration zone of an exhaust tube suitable for use within the disclosed aspiration system in accordance with aspects of the present subject matter, particularly illustrating an airflow area modifier including multiple diaphragm members at an orientation such that a dimension of a cross-sectional flow area of the aspiration zone is at a maximum;

FIG. 7 illustrates another cross-sectional view of the embodiment of the aspiration zone of FIG. 6 in accordance with aspects of the present subject matter, particularly illustrating the multiple diaphragm members at an orientation such that the dimension of the cross-sectional flow area of the aspiration zone is at a minimum;

Figure 1:
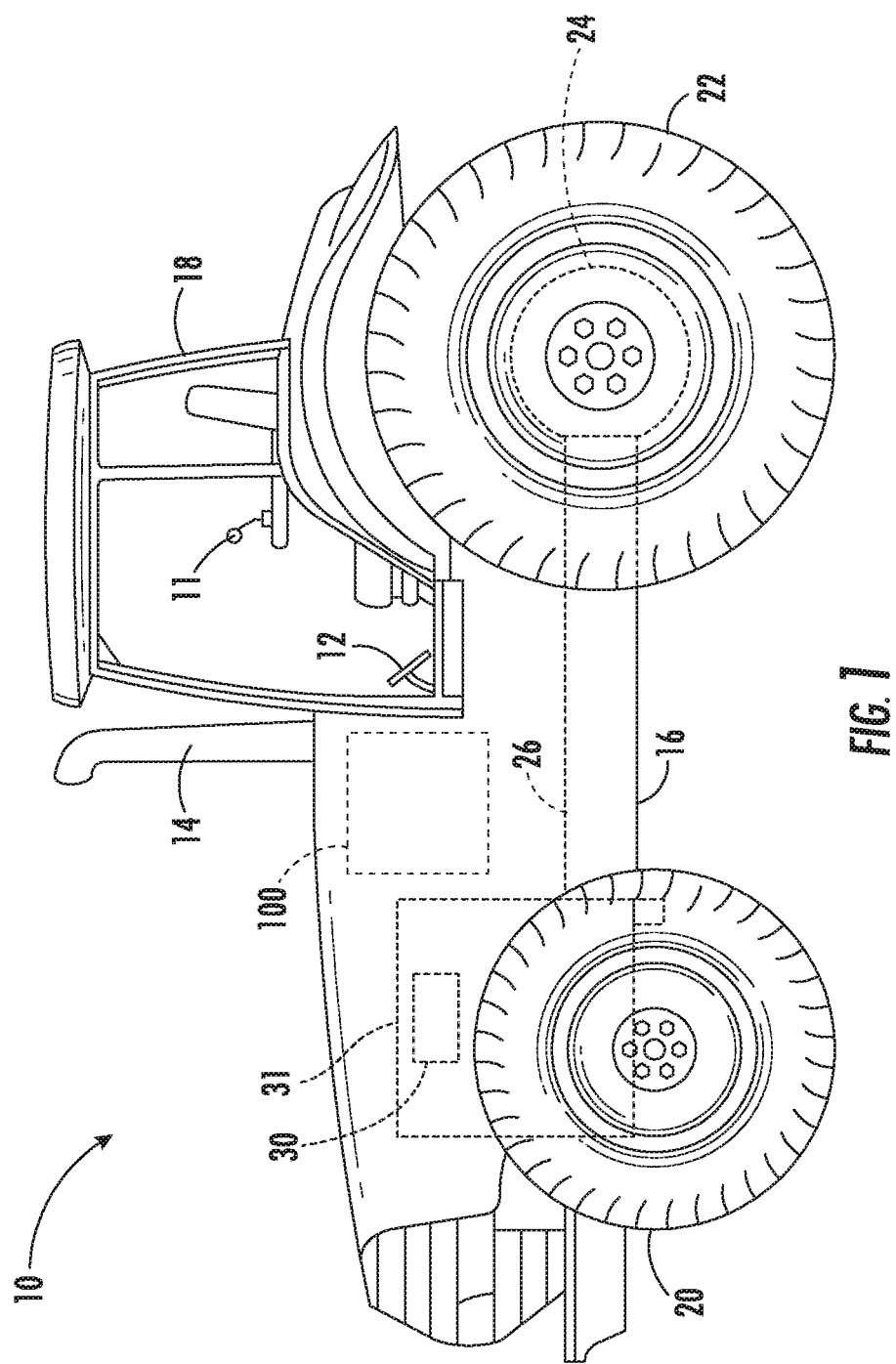
FIG. 1 illustrates a side view of one embodiment of work vehicle in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an aspiration system for a work vehicle. Specifically, in several embodiments, the aspiration system may include an exhaust tube defining an exhaust passage through which exhaust gases from an engine of the work vehicle are directed. The exhaust tube includes an aspiration zone. The aspiration system also includes an aspiration tube defining an aspiration passage therein fluidly connected to the aspiration zone to receive an aspirated airflow. For instance, the aspiration tube may be configured to extend between the aspiration zone of the exhaust passage and a separate component of an air filtration system of the work vehicle, such as a pre-cleaner of the air filtration system. As such, when exhaust gases flow through the exhaust passage of the exhaust tube, a vacuum may be created within the aspiration passage so as to aspirate or provide a vacuum to the pre-cleaner, thereby removing particles from the pre-cleaner.

Furthermore, in accordance with aspects of the present subject matter, the system may include an airflow area modifier provided in operative association with the aspiration zone of the exhaust tube. In general, the airflow area modifier is configured to adjust a cross-sectional flow area of the aspiration zone to vary the speed of the exhaust gases flowing through the exhaust passage, thereby adjusting the vacuum applied through the aspiration tube to the pre-cleaner. As such, the disclosed aspiration system may provide greater aspiration to the pre-cleaner than conventional aspiration systems. Additionally, or alternatively, the airflow area modifier may also be configured to adjust the cross-sectional flow area of the aspiration zone to allow any backpressure within the exhaust tube to be reduced.

It should be appreciated that, in general, the present subject matter will be described herein as being used to aspirate the pre-cleaner of a vehicle's air filtration system. However, in other embodiments, the disclosed aspiration system may be utilized as an aspiration source for any other suitable component of the work vehicle.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, road vehicles, all-terrain vehicles, off-road vehicles, loaders, and/or the like.

As shown in FIG. 1, the work vehicle 10 includes a pair of front wheels 20, a pair of rear wheels 20, and a chassis 16 coupled to and supported by the wheels 20, 22. An operator's cab 18 may be supported by a portion of the chassis 16 and may house various control devices 11, 12 (e.g., levers, pedals, control panels and/or the like) for permitting an operator to control the operation of the work vehicle 10. Additionally, the work vehicle 10 may include an engine 30 mounted on the chassis 16 and positioned within an engine compartment 31 as well as a transmission 26 mounted on the chassis 16. The transmission 26 may be operably coupled to the engine 30 and may provide variably adjusted gear ratios for transferring engine power to the wheels 22 via a differential 24.

Moreover, the work vehicle 10 may also include an exhaust treatment system for reducing the amount emissions contained within the exhaust from the engine 30, with the exhaust treatment system including an associated aspiration system 100. For instance, engine exhaust expelled from the engine 30 may be directed through the exhaust treatment system to allow the levels of nitrous oxide (NOx) emissions contained within the exhaust to be reduced significantly. The cleaned or treated exhaust gases may then be expelled from the exhaust treatment system into the surrounding environment via an exhaust tube 14 of the work vehicle 10.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine 30, transmission 16, and differential 18 are coupled, a configuration common in smaller tractors. Still, other configurations may use an articulated chassis to steer the work vehicle 10 or rely on tracks in lieu of the wheels 20, 22. Additionally, although not shown, the work vehicle 10 may also be configured to be operably coupled to any suitable type of work implement, such as a trailer, spray boom, manure tank, feed grinder, plow, and/or the like.

Figure 2:
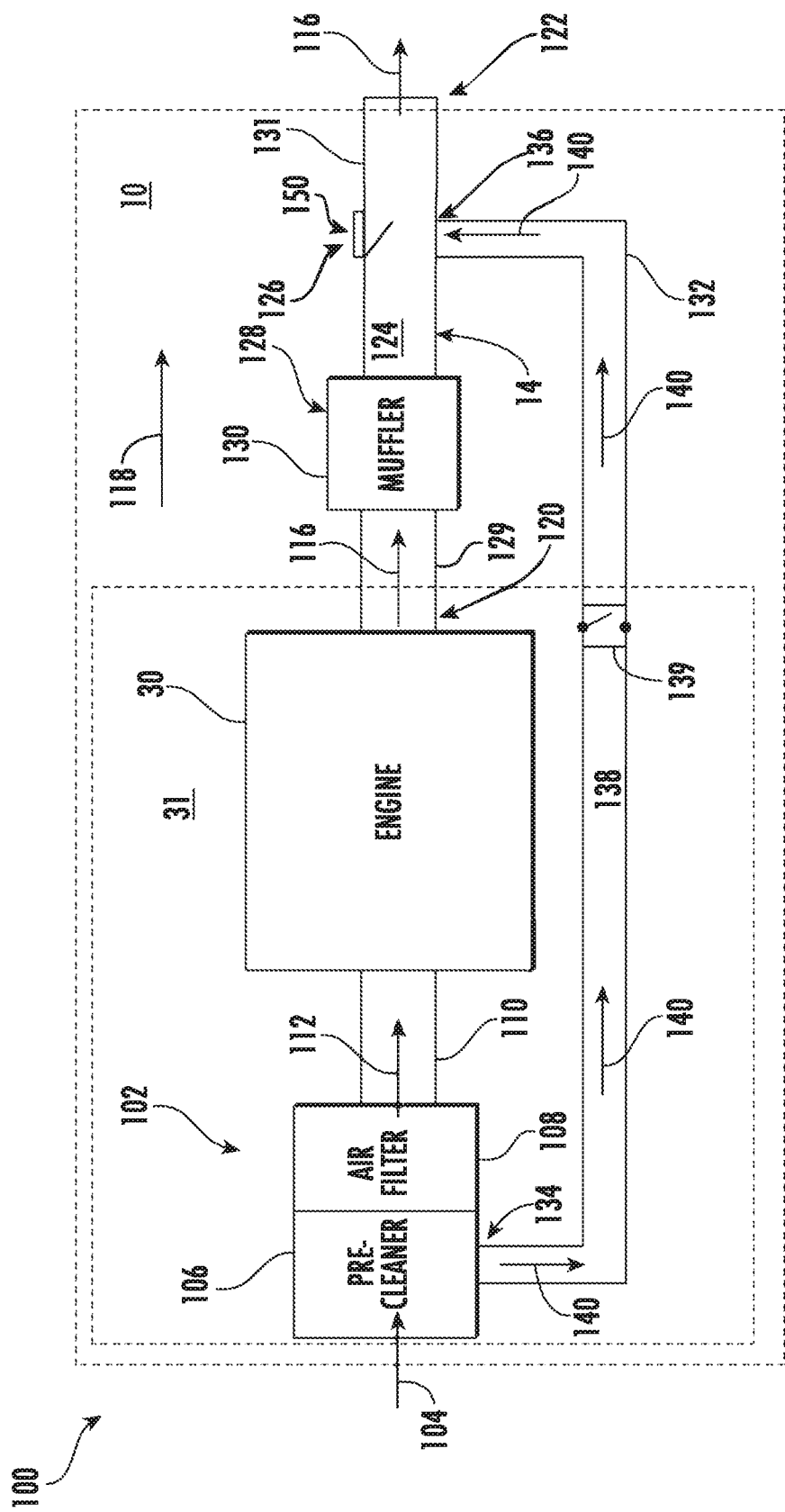
FIG. 2 illustrates a schematic view of one embodiment of an aspiration system for a work vehicle in accordance with aspects of the present subject matter.

Referring now to FIG. 2, a schematic, side view of one embodiment of an aspiration system 100 for aspirating a component of a work vehicle is illustrated in accordance with aspects of the present subject matter. In general, the aspiration system 100 will be described herein with reference to the work vehicle 10 described above with reference to FIG. 1. However, it should be appreciated by those of ordinary skill in the art that the disclosed system 100 may generally be utilized with work vehicles having any other suitable work vehicle configuration.

As shown in FIG. 2, the aspiration system 100 may include various components of the work vehicle 10. For example, in one embodiment, the aspiration system 100 may include the engine 30 of the work vehicle 10. However, it should be appreciated that, in alternative embodiments, the aspiration system 100 may include any other suitable components of the work vehicle 10. For instance, the aspiration system 100 may be equally suitable for use in association with a turbocharger or a work vehicle 10 including a turbocharger.

Moreover, the aspiration system 100 may include an air filtration system 102 configured to filter intake air (e.g., as indicated by arrow 104 in FIG. 2) entering the engine 30 for use in the combustion process. Specifically, in several embodiments, the air filtration system 102 may include a pre-cleaner 106. In general, the pre-cleaner 106 may be configured to remove particles present in the intake air 104 flowing through the pre-cleaner 106. For example, as will be described below, the pre-cleaner 106 may be aspirated or provided with a vacuum that draws the particles present within the pre-cleaner 106 out of the flow of the intake air 104. The air filtration system 102 may also include an air filter 108 positioned downstream of the pre-cleaner 106. In general, the air filter 108 may be configured to remove particles remaining in the intake air 104 as the intake air 104 passes through the air filter 108. For example, in one embodiment, the air filter 108 may be at least partially formed from a fibrous, porous, or mesh material that permits the intake air 104 to flow through the air filter 108, while trapping or capturing particles still present in the intake air 104. Additionally, an intake conduit 110 may fluidly couple the air filtration system 102 and the engine 30 so as to provide filtered air (e.g., as indicated by arrow 112 in FIG. 2) from the air filtration system 102 to the engine 30 for use in the combustion process. However, it should be appreciated that, in alternative embodiments, the air filtration system 102 may have any other suitable configuration.

As shown in FIG. 2, the air filtration system 102 may be mounted or positioned within the engine compartment 31 of the work vehicle 10. However, one of ordinary skill in the art would appreciate that the air filtration system 102 may be mounted or positioned in any other suitable location of the work vehicle 10, such as outside of the engine compartment 31.

Furthermore, the aspiration system 100 may also include an exhaust tube 14 configured to convey exhaust gases (e.g., as indicated by arrows 116 in FIG. 2) from the engine 30 to a location outside of the engine compartment 31 of the work vehicle 10. Specifically, in several embodiments, the exhaust tube 14 may extend along a flow direction (e.g., as indicated by arrow 118 in FIG. 2) from an upstream end 120 of the exhaust tube 14 to a downstream end 122 of the exhaust tube 14. In general, the exhaust tube 14 may define an exhaust passage 124 extending from the upstream end 120 of the exhaust tube 14 to the downstream end 122 of the exhaust tube 14 through which the exhaust gases 116 may flow. As such, the upstream end 120 of the exhaust tube 14 may be coupled to the engine 30 (e.g., an exhaust manifold of the engine 30) such that the exhaust gases 116 flow into the exhaust passage 124 from the engine 30. The downstream end 122 of the exhaust tube 14 may generally be positioned outside of the engine compartment 31 and/or the work vehicle 10 so as to allow the exhaust gases 116 flowing through the exhaust tube 14 to be exhausted into an ambient atmosphere outside of the engine compartment 31 and/or the work vehicle 10. As will described below, the exhaust tube 14 may include an aspiration zone 126 positioned between the upstream and downstream ends 120, 122 of the exhaust tube 14.

Moreover, the aspiration system 100 may include one or more exhaust gas conditioning devices 128. In general, the exhaust gas conditioning device(s) 128 may be configured to adjust or condition a characteristic (e.g., sound, chemical content, etc.) of the exhaust gases 116 flowing through the exhaust passage 124. For example, as shown in FIG. 2, in one embodiment, the exhaust gas conditioning device(s) 128 may be configured as a muffler 130. In this regard, as is generally understood, the muffler 130 may include various baffles, passages, acoustic insulation packets, and/or the like, which are configured to reduce an intensity or volume of a sound emitted by the exhaust gases 116 and/or the combustion process. However, it should be appreciated that, in alternative embodiments, the exhaust gas conditioning device(s) 128 may be configured as any other suitable exhaust gas conditioning device, such as a catalytic converter or a particulate filter. Furthermore, it should be appreciated that the aspiration system 100 may include a combination of any suitable exhaust gas conditioning devices 128. For example, in one embodiment, the aspiration system 100 may include a catalytic converter, a particulate filter, and the muffler 130.

In several embodiments, the exhaust gas conditioning device(s) 128 may be positioned at a location(s) upstream of the aspiration zone 126 of the exhaust tube 14. For example, as shown in FIG. 2, the muffler 130 may be positioned such that an upstream exhaust tube section 129 of the exhaust tube 14 extends between the upstream end 120 of the exhaust tube 14 and the muffler 130, and a downstream exhaust tube section 131 of the exhaust tube 14 extends between the muffler 130 and the downstream end 122 of the exhaust tube 14. In such an embodiment, the aspiration zone 126 may be positioned within and/or form part of the downstream exhaust tube section 131. However, it should be appreciated that, in alternative embodiments, the exhaust gas conditioning device(s) 128 may be positioned and/or integrated within the exhaust tube 14 at any other suitable location, including location(s) downstream of the aspiration zone 126.

In accordance with aspects of the present subject matter, the aspiration system 100 may further include an aspiration tube 132. In general, and as will be described below, the aspiration tube 132 may be configured to aspirate or provide a vacuum to the pre-cleaner 106 so as to allow particles to be removed from the intake air 104 flowing through the pre-cleaner 106. Specifically, in several embodiments, the aspiration tube 132 may extend from an upstream end 134 of the aspiration tube 132 to a downstream end 136 of the aspiration tube 132. In general, the aspiration tube 132 may define an aspiration passage 138 extending from the upstream end 134 of the aspiration tube 132 to the downstream end 136 of the aspiration tube 132 through which aspirated airflow (e.g., as indicated by arrows 140 in FIG. 2) may flow so as to aspirate the pre-cleaner 106. As such, the upstream end 134 of the aspiration tube 132 may be coupled to the pre-cleaner 106 so that the aspirated airflow 140 flows into the aspiration passage 138 from the pre-cleaner 106. The downstream end 136 of the aspiration tube 132 may be coupled to the aspiration zone 126 of the exhaust tube 14 such that the aspirated airflow 140 flows into the exhaust passage 124 from the aspiration passage 138. However, it should be appreciated that, in alternative embodiments, the upstream end 134 of the aspiration tube 132 may be coupled to any other suitable component of the work vehicle 10 that is separate from the exhaust tube 14 so as to provide aspiration to that component. Additionally, as shown, a valve 139 may be disposed within aspiration tube 132 in order to restrict or close off the aspiration passage 138. For example, the valve 139 may be controllable to reduce or close-off the aspirated airflow 140.

As further illustrated in FIG. 2, and described in more detail below, the aspiration system 100 may further include an airflow area modifier 150 provided in operative association with the aspiration zone 126 of the exhaust tube 14. Generally, the airflow area modifier 150 may be configured to adjust a cross-sectional flow area of the aspiration zone 126. As such, the airflow area modifier 150 may be used, for example, to narrow or throttle the aspiration zone 126, and thus reduce a cross-sectional flow area of the aspiration zone 126, in order to accelerate the exhaust gases 116 flowing therethrough. By reducing the cross-sectional flow area, a static pressure of such exhaust gases 116 at the aspiration zone 126 may be reduced. By reducing the static pressure of the exhaust gases 116 at the aspiration zone 126, the aspiration zone 126 may generate an enhanced aspirated airflow 140 through the aspiration passage 138 in order to remove particulates from the air filtration system 102, such as from the pre-cleaner 106. Contrarily, the airflow area modifier 150 may be used to expand the aspiration zone 126, and thus increase the cross-sectional flow area 162 of the aspiration zone 126, in order to reduce the acceleration of the exhaust gases 116 flowing therethrough. By increasing the cross-sectional flow area, and the static pressure of such exhaust gases 116 at the aspiration zone 126 may be increased. Moreover, by increasing the cross-sectional flow area 126 at the aspiration zone 126, any undesirable backpressure within the exhaust tube 14 may be avoided or reduced. However, it should be appreciated that decreasing the local velocity of the exhaust gases 116 through the aspiration zone 126, and thereby increasing the static pressure of the exhaust gases 116 at the aspiration zone 126, may also reduce the vacuum level supplied to the aspiration passage 138 and thus reduce the generated aspirated airflow 140.

Figure 3:
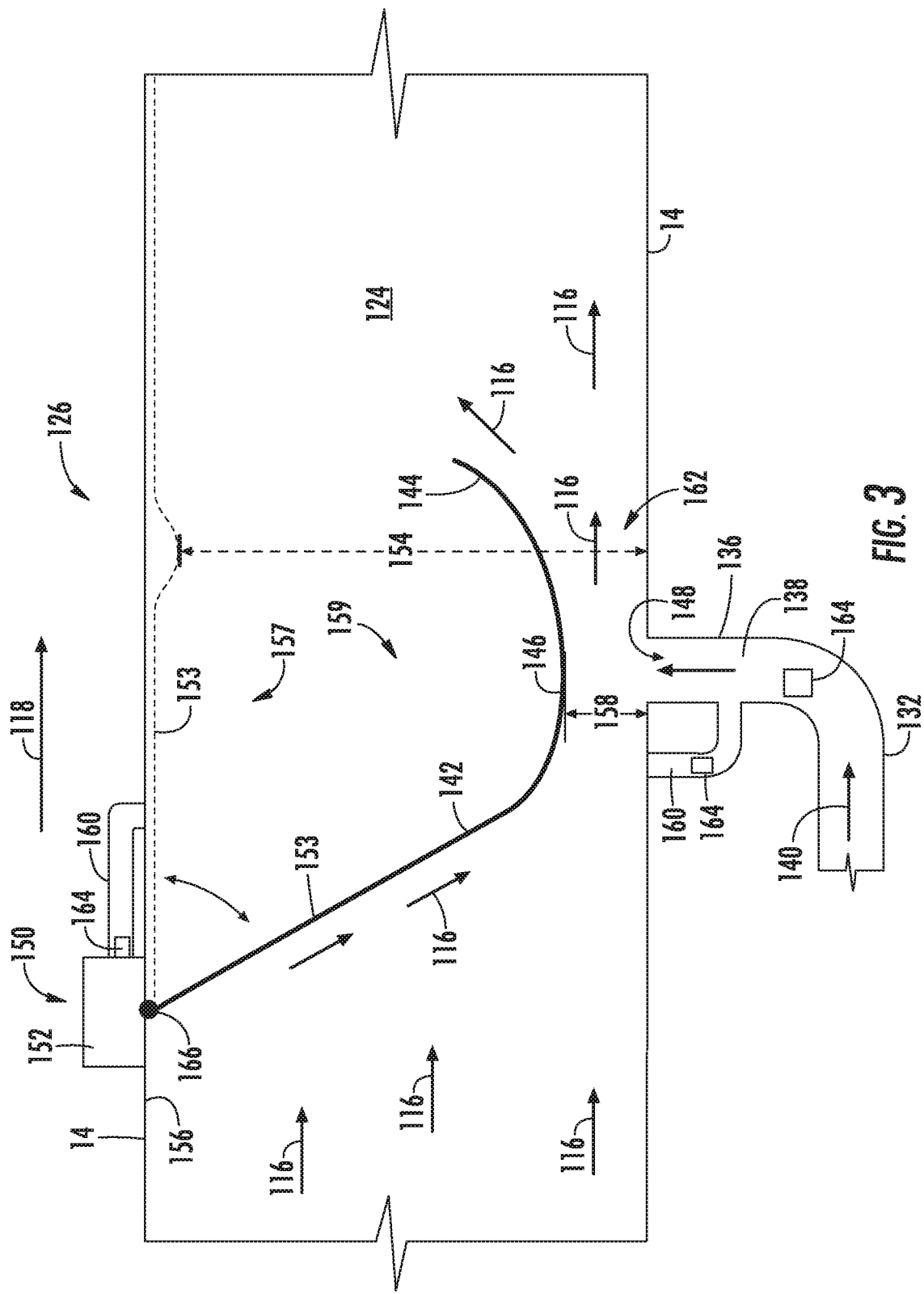
FIG. 3 illustrates a cross-sectional view of one embodiment of an aspiration zone of an exhaust tube suitable for use within the disclosed aspiration system in accordance with aspects of the present subject matter, particularly illustrating an airflow area modifier provided in association with the aspiration zone.

Referring now to FIG. 3, a cross-sectional view of one embodiment of the aspiration zone of the exhaust tube described above is illustrated in accordance with aspects of the present subject matter. Particularly, FIG. 3 illustrates an airflow area modifier 150 provided in association with the aspiration zone 126. As shown, the aspiration zone 126 of the exhaust tube 14 may define an aperture configured to receive an outlet 148 of the aspiration tube 132. Further, the outlet 148 may fluidly couple the exhaust passage 124 and the aspiration passage 138 so as to permit the aspirated airflow 140 to flow into the exhaust passage 124 from the aspiration passage 138. Specifically, in several embodiments, the aperture may be at least partially defined by or through the aspiration zone 126 of the exhaust tube 14. Furthermore, in one embodiment, the aperture may correspond to a circumferentially extending slot defined around a circumference of the exhaust tube 14. In such an embodiment, an annular manifold may be coupled between the aspiration tube 132 and the exhaust tube 14 such that the aspirated airflow 140 may flow into the exhaust passage 124 from the aspiration passage 138 throughout the entire circumference of the aperture. Additionally, or alternatively, the aspiration tube 132 may, in one embodiment, extend into the exhaust tube 14 in order to fluidly couple the exhaust passage 124 and the aspiration passage 138 so as to permit the aspirated airflow 140 to flow into the exhaust passage 124 from the aspiration passage 138. For instance, the outlet 148 of the aspiration tube 132 may be positioned within the aspiration zone 126 such that the flow of the exhaust gases 116 past the outlet 148 generates the aspirated airflow 140 through the aspiration passage 138. However, one of ordinary skill in the art would appreciate that, in alternative embodiments, the outlet 148 and/or aperture(s) may have any other suitable shape or configuration and/or be defined by any other suitable region of the aspiration zone 126. For example, in one embodiment, a plurality of aspiration tubes 132 may fluidly couple the exhaust passage 124 to the air filtration system 102 to permit aspirated airflows 140 to flow into the exhaust passage 124 from a plurality of associated aspiration passages 138.

Referring now to FIGS. 2 and 3, as indicated above, in several embodiments, the aspiration system 100 may be configured to aspirate or provide a vacuum to the pre-cleaner 106 of the air filtration system 102 to remove particles from the intake air 104 flowing through the pre-cleaner 106. During operation of the work vehicle 10, the exhaust gases 116 produced by the engine 30 may flow through the exhaust passage 124 in the flow direction 118. In this regard, the aspiration zone 126 may be configured to adjust a flow parameter of exhaust gases 116 flowing through the exhaust passage 124. For example, in one embodiment, the airflow area modifier 150 associated with the aspiration zone 126 may be configured to increase the velocity or speed of the exhaust gases 116 as the exhaust gases 116 flow through the aspiration zone 126. In several embodiments, at least a portion of the airflow area modifier 150 may be disposed within the aspiration zone 126 of the exhaust tube 14.

In certain situations, the velocity or speed of the exhaust gases 116 flowing through the aspiration zone 126 may not be high enough to create a vacuum or low pressure area within the aspiration zone 126 sufficient to remove impurities, particulates, or the like from the air filtration system 102 to the degree desired or required. For instance, in low RPM or power output conditions of the engine 30, such as idle conditions, the speed and/or velocity of the exhaust gases 116 may not be high enough to create a sufficient vacuum level. This may be particularly true when the aspiration zone 126 of the exhaust tube 14 is sized for working or loaded conditions of the engine 30. In such instance, the air filter 108 may become clogged prematurely and require replacement sooner than when the intake air 104 has been properly aspirated to remove such particles present in the intake air 104 passing through the pre-cleaner 106. As such, by adjusting the cross-sectional flow area of the exhaust tube 14 within the aspiration zone 126, the velocity of the exhaust gases 116 may be locally increased at the aspiration zone 126, thereby provided a lower pressure zone and more effectively aspirating particles from the pre-cleaner 106.

More specifically, in the illustrated embodiment, the airflow area modifier 150 may reduce the cross-sectional flow area of the aspiration zone 126 to increase the speed of the exhaust gases 116 flowing around the outlet 148 of the aspiration tube 132. For instance, as shown in the embodiment of FIG. 3, the airflow area modifier 150 may include a flap 153 pivotably coupled to the exhaust tube 14. For example, the flap 153 may be coupled to an interior surface of the exhaust tube 14 at a pivot point 166. As such, the flap 153 may be configured to be pivoted about the pivot point 166 to alter a distance between the flap 153 and the outlet 148 of the aspiration tube 132 as an orientation of the flap 153 is altered. As shown, the flap 153 may be pivoted in order to reduce a dimension of the aspiration zone 126 within the exhaust tube 14 from a first length 154 corresponding to a first position 157 of the flab 153 to a second length 158 corresponding to a second position 159 of the flap 153, smaller than the first length 154. For instance, the dimension may be defined perpendicular to both the axis of rotation of the pivot point 166 and the flow direction 118. As such, a cross-sectional flow area 162 of the exhaust tube 14 within the aspiration zone 126 may be decreased, accelerating the flow of exhaust gases 116 therethrough and thereby reducing the static pressure within the aspiration zone 126 and increasing the aspiration of the pre-cleaner 106. More specifically, the increased speed of the exhaust gases 116 may reduce the static pressure within the aspiration zone 126 so as to generate a suction force that is applied to the aspiration tube 132, thereby drawing the aspirated airflow 140 through the aspiration passage 138 and aspirating or providing a vacuum to the pre-cleaner 106. The vacuum applied to the pre-cleaner 106 via the aspiration tube 132 may, in turn, draw particles out of the intake air 104 flowing through the pre-cleaner 106.

In other situations, the volume of the exhaust gases 116 flowing through the aspiration zone 126 may be too high for the cross-sectional flow area 162 of the exhaust tube 14 within the aspiration zone 126 and may, thus, create an increased pressure zone forward of the aspiration zone 126. Such a situation may cause undesirable backpressure within the aspiration zone 126, which may propagate towards the upstream end 120 of the exhaust tube 14 and negatively impact engine performance for the work vehicle 10, such as reducing fuel efficiency. For instance, in high RPM and/or high power output conditions of the engine 30, such as when the engine 30 is loaded above an ideal operating condition, the speed and/or velocity of the exhaust gases 116 may be too high for the cross-sectional flow area 162 of the aspiration zone 126 for the orientation of the flap 153. In such instance, throttling the exhaust gases 116 too much at the aspiration zone 126 may create a high pressure zone forward of the aspiration zone 126. This may be particularly true when the cross-sectional flow area 162 of the exhaust tube 14 within the aspiration zone 126 has been reduced to provide the desired aspiration level at low RPMs and/or power outputs of the engine 30. In such instance, the flap 153 may be pivoted in order to expand the dimension of the aspiration zone (e.g., from the second position 159 to the first position 159 of the flap 153). As such, the cross-sectional flow area 162 of the exhaust tube 14 within the aspiration zone 126 may be increased, thereby increasing the general flow of exhaust gases 116 through the exhaust passage 124 and/or decreasing the resistance to such flow and decreasing the backpressure within the exhaust tube 14.

While two positions 157, 159 of the flap 153 corresponding to lengths 154, 158 are illustrated in FIG. 3, it should be understood the flap 153 may be pivoted to any position defining a length between the first length 154 and the second length 158.

In an additional embodiment, as shown in FIG. 3, the flap 153 may define an arcuate profile such that the cross-sectional flow area 162 of the exhaust tube 14 is varied along the length of the flap 153 relative to the flow direction 118. For example, the flap 153 may include a converging section 142 and a diverging section 144. In general, the cross-sectional flow area 162 of the exhaust tube 14 may narrow or contract along the flow direction 118 adjacent to the converging section 142 of the flap 153. Conversely, the cross-sectional flow area 162 of the exhaust tube 14 may expand along the flow direction 118 adjacent to the diverging section 144 of the flap 153. Furthermore, the flap 153 may include a throat section 146 extending between the converging and diverging sections 142, 144. In several embodiments, flap 153 may be configured such that the throat section 146 is positioned directly opposite the outlet 148 of the aspiration tube 132 when the flap 153 is fully pivoted into the exhaust passage 124. In this regard, the section of the exhaust passage 124 defined by the aspiration zone 126 may contract and then expand along the length of the flap 153 in the flow direction 118 so as to increase the speed of the exhaust gases 116 that are flowing through the exhaust passage 124 near the outlet 148. More specifically, in the illustrated embodiment, the arcuate profile of the flap 153 may reduce the cross-sectional flow area 162 of exhaust tube 114 within the aspiration zone 126 to increase the speed of the exhaust gases 116 flowing around the outlet 148 of the aspiration tube 132.

As depicted in FIG. 3, the flap 153 may be configured to be elastic such that the flap 153 deforms when forced against the interior surface of the exhaust tube 14. For instance, when the flap 153 is pivoted to the first position 157 (e.g., when the dimension of the exhaust tube 14 is at a maximum length 154), the flap 153 may be configured to deform to match or approximate the shape of the exhaust tube 14 as the flap 153 is pressed against the interior surface of the exhaust tube 14. As such, it should be appreciated that the flap 153 may deform to reduce the arcuate profile defined by the flap 153 or increase the radius of the arcuate profile to more approximately resemble a linear profile. For example, the converging section 142 and/or diverging section 144 may define linear or approximately linear profiles when fully deformed. As such, if pivoting the flap 153 toward the first position to contact the interior surface of the exhaust tube 14 does not reduce the backpressure within the exhaust tube 14 to the degree desired or required, the flap 153 may be further pivoted in order to deform the flap 153 to reduce or eliminate any acceleration of the exhaust flow 116 generated by the arcuate profile of the flap 153.

It is contemplated that the dimension of exhaust tube 14 oriented parallel to the axis of rotation of the flap 153, e.g., a height in and out of the page of FIG. 3, may be constant within the aspiration zone 126. For instance, the exhaust tube 14 may define a square, rectangular, or similar cross-section within the aspiration zone 126. As such, the flap 153 may be flush with two interior surfaces of the exhaust tube 14 and freely pivot about the pivot point 166. However, as explained in more detail with reference to FIGS. 4 and 5 below, by forming the flap 153 from an elastic material, the flap 153 may be pivoted within the exhaust tube 14 with a variable height (e.g., the dimension in and out of the page of FIG. 3). As such, the flap 153 may deform to accommodate different heights associated with different orientations of the flap 153. Generally, an elastic material may include any material that allows the flap to deform as described herein while simultaneously being resistant to the temperature and chemical composition of the exhaust gases 116. As way of example and not limitation, the flap 153 may be formed, at least in part, from a polymer, rubber, elastomer, plastic, composite, or the like.

As shown in FIG. 3, in one embodiment, an actuator (modifier actuator 152) may be provided in operative association with the flap 153 and configured to alter the orientation of the flap 153 when reduction adjustment of the cross-sectional flow area 162 of the exhaust tube 14 within the aspiration zone 126 is desired. For example, the modifier actuator 152 may be configured to pivot the flap 153 about the pivot point 166. In the embodiment of FIG. 3, the modifier actuator 152 is configured as a rotary actuator provided at or adjacent to the pivot point 166. However, in other embodiments, the modifier actuator 152 may correspond to a linear actuator coupled between the interior surface of the exhaust tube 14 and a downstream surface of the flap 153 relative to the flow direction 118. As such, extending or retracting the linear actuator may cause the flap 153 to rotate about the pivot point 166.

In general, the modifier actuator 152 may correspond to an electric, hydraulic, pneumatic, or any other actuator suitably configured to alter the orientation of the airflow area modifier 150 in order to adjust the cross-sectional flow area 162 of the exhaust tube 14 within the aspiration zone 126. The modifier actuator 152 may be powered or otherwise activated in order to alter the orientation of the flap 153 between the first position 157 and the second position 159 to reduce the dimension of the aspiration zone 126 within the exhaust tube 14, such as from the first length 154 to the second length 158. As such, the cross-sectional flow area 162 may be decreased, thereby reducing the static pressure within the aspiration zone 126 and increasing the aspiration of the pre-cleaner 106. Contrarily, when the backpressure within the exhaust tube 14 is too high, the modifier actuator 152 may be powered or otherwise activated in order to expand the dimension (e.g., from the second length 158 to the first length 154). As such, the cross-sectional flow area 162 may be increased, thereby increasing the general flow of exhaust gases 116 through the exhaust passage 124 or reducing the resistance to such flow and decreasing the backpressure within the exhaust tube 14.

Still referring to the embodiment of FIG. 3, an optional actuator line 160 may be fluidly coupled between the modifier actuator 152 and the aspiration tube 132 in order to provide flow communication therebetween. In such an embodiment, the modifier actuator 152 may be configured such that a change in pressure within the actuator line 160 automatically alters the orientation of the airflow area modifier 152, such as by pivoting the flap 153 about the pivot point 166. As one example, the modifier actuator 152 may be configured as a wastegate. A wastegate typically includes an inlet port, an outlet port, a valve, and a pressure actuator. Generally, the vacuum level of the aspiration line 132 may be communicated as a negative pressure indicative of such vacuum level through the actuator line 160 and may act on the pressure actuator of the wastegate. For instance, the wastegate may be configured to have a set point where the flap 153 is at the second position 159. As the velocity of the exhaust gases 116 increases, the negative pressure acting on the pressure actuator of the wastegate may also increase as the vacuum level within the aspiration line 132 increases. Further, the pressure actuator of the wastegate may be configured to activate the valve in response to a change in the negative pressure within the actuator line 160. Further, the valve may be operatively associated with the flap 153 such that the orientation of the flap 153 is altered as the value is activated.

For example, when an increasing velocity of the exhaust gases 116 causes the vacuum level to increase over a predetermined level or range, the pressure actuator of the wastegate may be configured to activate the valve and thus pivot the flap 153 toward the first position 157. Thus, the cross-sectional flow area 162 may be increased and thereby reduce the vacuum level below the predetermined level or within the predetermined range. Similarly, when a decreasing velocity of the exhaust gases 116 causes the vacuum level to decrease below a predetermined level or range, the pressure actuator of the wastegate may be configured to activate the valve and thus pivot the flap 153 toward the second position 159. Thus, the cross-sectional flow area 162 may be decreased and thereby increase the vacuum level above the predetermined level or within the predetermined range. The predetermined level or predetermine range of vacuum levels may correspond to a vacuum level or range of vacuum levels suitable to provide a desired amount of aspirated airflow 140 while reducing the backpressure within the exhaust tube 14 to within acceptable levels.

Figure 8:
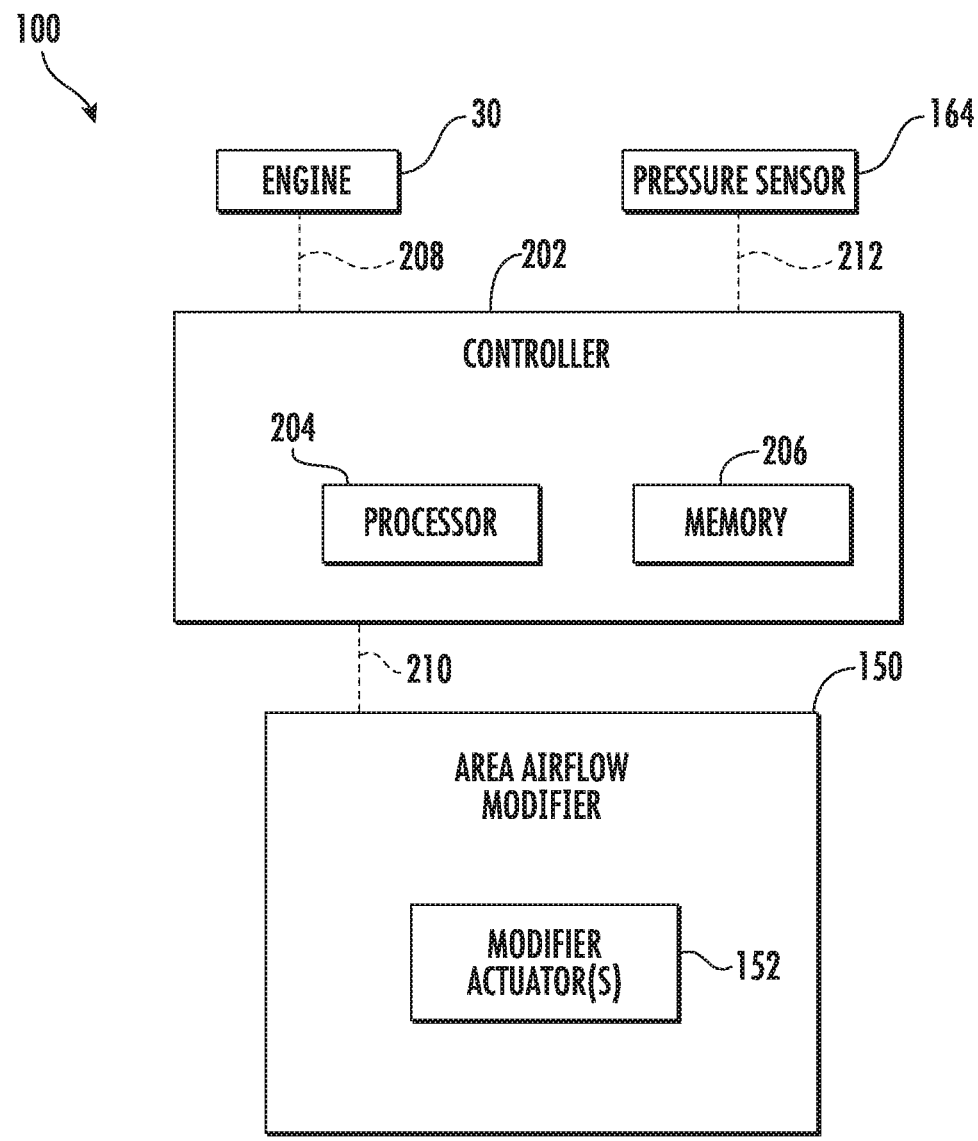
FIG. 8 illustrates a schematic view of one embodiment of an aspiration system for a work vehicle in accordance with aspects of the present subject matter.

Further, as described in more detail below with reference to FIG. 8, the modifier actuator 152 may be configured to alter the orientation of the flap 153 based on pressure feedback provided by a corresponding sensor (pressure sensor 164) provided in operative association with the aspiration tube 132. Generally, the pressure sensor 164 configured to capture pressure data indicative of the vacuum level within the aspiration zone 126, the aspiration tube 132, and/or at the pre-cleaner 106. For example, the pressure sensor 164 may be configured to transmit associated pressure data to a corresponding system controller 202 (such as via one or more communicative links 212 as shown in FIG. 8). As shown, the pressure sensor 164 may be arranged within the actuator line 160 at or adjacent to the modifier actuator 152. For example, the modifier actuator 152 and pressure sensor 164 may be a single integrated component. However, the pressure sensor 164 may otherwise be positioned within the actuator line 160 at any other location or may be positioned within an additional line in fluid communication with the aspiration tube 132. In one embodiment, the pressure sensor 164 may be positioned within the aspiration tube 132. Additionally, it should be appreciated that pressure sensor 164 may generally correspond to any sensing device suitably configured to capture data indicative of the vacuum level within the aspiration zone 126.

Figure 4:
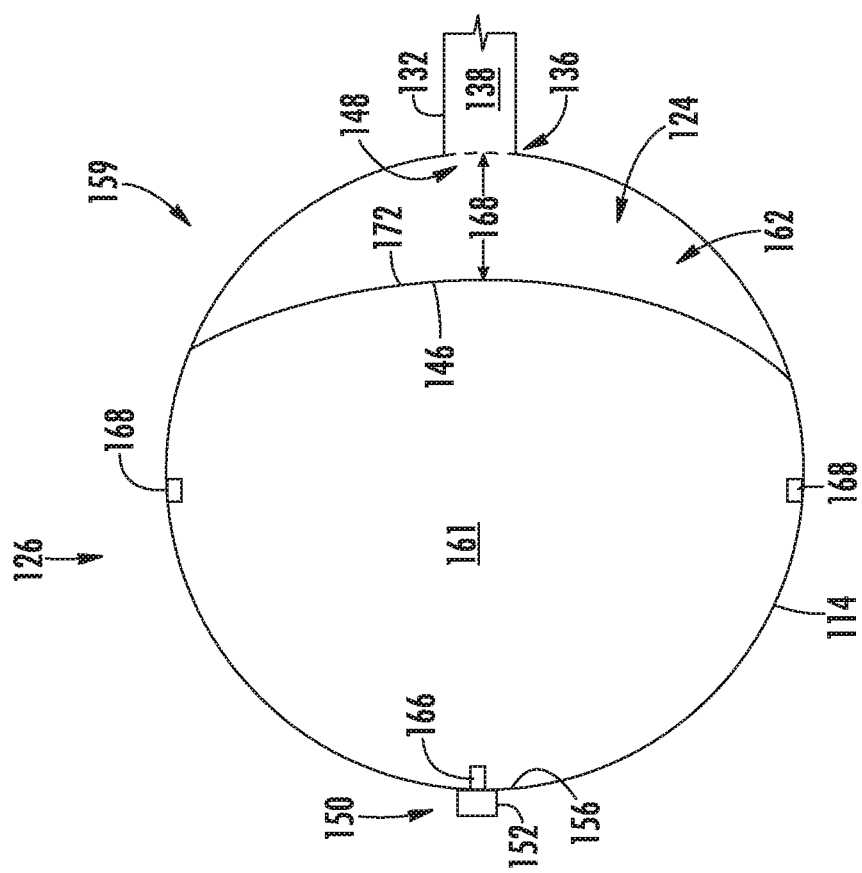
FIG. 4 illustrates a cross-sectional view of another embodiment of an aspiration zone of an exhaust tube suitable for use within the disclosed aspiration system in accordance with aspects of the present subject matter, particularly illustrating an elastic airflow area modifier at an orientation such that a dimension of a cross-sectional flow area of the aspiration zone is at a maximum.
Figure 5:
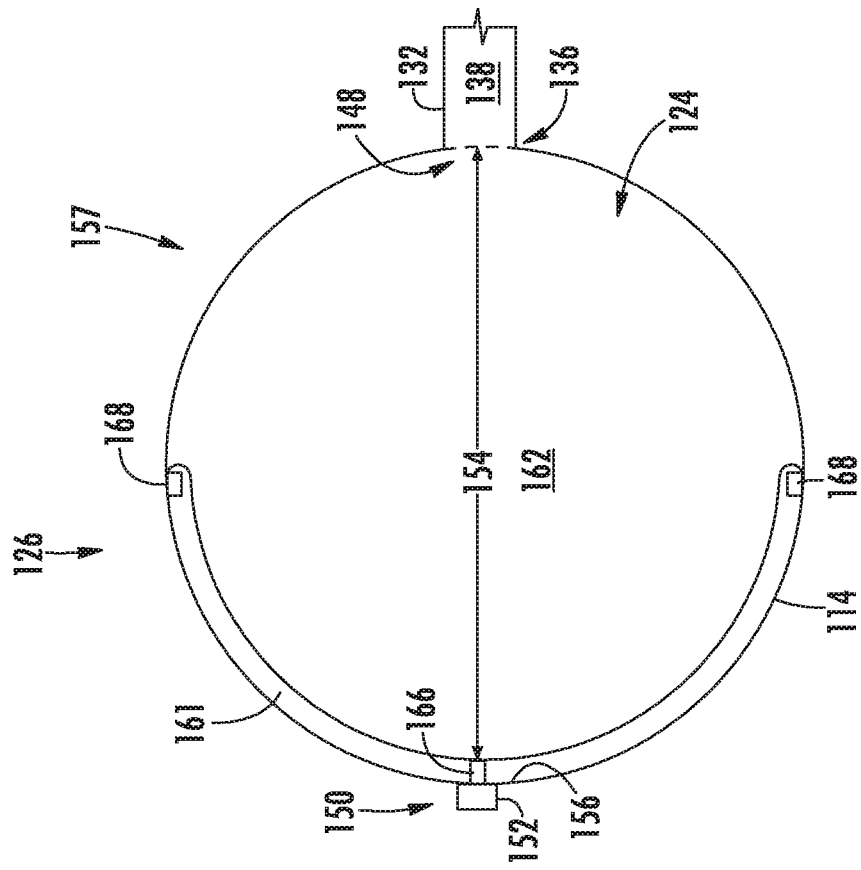
FIG. 5 illustrates another cross-sectional view of the embodiment of the aspiration zone of FIG. 4 in accordance with aspects of the present subject matter, particularly illustrating the elastic airflow area modifier at an orientation such that the dimension of the cross-sectional flow area of the aspiration zone is at a minimum.

Referring now to FIGS. 4 and 5, cross-sectional views of an additional or alternative embodiment of an aspiration zone of an exhaust tube defining a circular cross-section is illustrated in accordance with aspects of the present subject matter. Particularly, FIG. 4 illustrates the aspiration zone 126 with an elastic airflow area modifier 150 at a first position 157 such that a dimension of a cross-sectional flow area 162 is at a maximum first length 154. FIG. 5 illustrates the aspiration zone 126 with the elastic airflow area modifier 150 at a different second position 159 such that the dimension of the cross-sectional flow area 162 is at a minimum second length 158. However, it should be appreciated that the aspects of aspiration zone 126 and airflow area modifier 150 may be utilized within any suitable aspiration system 100 of a given work vehicle 10.

The aspiration zone 126 of FIGS. 4 and 5 may generally be configured the same as or similar to the aspiration zone 126 of FIG. 3. For instance, the airflow area modifier 150 provided in association with the aspiration zone 126 may be configured as a flap extending within the exhaust tube 14 along the flow direction 118. Further, the orientation of the flap may define the cross-sectional flow area 162 of the exhaust tube 14 within the aspiration zone 126 such that the cross-sectional flow area 162 may be altered by adjusting the orientation of the flap. Further, by changing the cross-sectional flow area 162, an aspiration level provided to the pre-cleaner 106 (FIG. 2) by the aspiration passage 138 may be adjusted and/or the backpressure within the exhaust tube 14 may be adjusted.

The airflow area modifier of FIGS. 4 and 5 may include an elastic flap 161 suitable for use within an aspiration zone 126 of the exhaust tube 14 that defines a cross-sectional shape that is not square or rectangular. More particularly, a flap that is elastic may allow for the flap to deform to accommodate the cross-sectional height of the aspiration zone 126. For instance, the exhaust tube 14 having a circular cross-section defines a maximum cross-sectional height or diameter. However, the cross-sectional height of the circular exhaust tube 14 decreases moving to either side of this maximum cross-sectional height. Thus, a flap that is sized for the maximum cross-sectional height and is also rigid would be prevented from pivoting about a pivot point 166 away from this maximum cross-sectional dimension. With reference particularly to FIG. 4, when the elastic flap 161 is oriented such that the cross-sectional flow area 162 is at a maximum (the first position 157) the elastic flap 161 may deform in order match or approximately match the shape of the interior of the exhaust tube 14. Moreover, by deforming to lie against the interior of the exhaust tube 14 adjacent to an associated modifier actuator 152, the elastic flap 161 may increase the maximum the cross-sectional flow area 162 that may be achieved as compared to a rigid flap.

When it is desired to reduce the static pressure of the exhaust gases 116 flowing through the aspiration zone 126, and thus increase the aspirated airflow 140 (FIG. 2), the modifier actuator 152 may be actuated or otherwise powered to reduce the cross-sectional flow area 162. For instance, as shown in FIG. 5, the modifier actuator 152 may pivot the flap 153 about the pivot point 166 in order to decrease the cross-sectional flow area 162. For instance, the flap 153 may be pivoted toward the second position 159 such that the dimension defines the second length 158. As the orientation of the elastic flap 161 is altered, the elastic flap 161 may deform in order to match the changing cross-sectional height of exhaust tube 14 at each orientation of the elastic flap 161. Particularly, as shown in FIG. 5, the elastic flap 161 may deform to accommodate the interior shape of the exhaust tube 14 adjacent to the outlet 148 of the aspiration tube 132. Contrarily, when it is desired to reduce the backpressure within the exhaust tube 14, the modifier actuator 152 may be actuated or otherwise powered to increase the cross-sectional flow area 162.

An elastic flap 161 configured to deform as described herein may allow for the elastic flap 161 to have a greater possible range of movement. Thus, the range of possible cross-sectional flow areas 162 achievable by the flap may be increased when the flap is elastic. Further, the elastic flap 161 that deforms with the shape of the exhaust tube 14 may further reduce or prevent the exhaust gases 116 from flowing around the elastic flap 161 at locations other than near the outlet 148 of the aspiration tube 132. As shown in FIGS. 4 and 5, the elastic flap 161 may be secured to the interior surface of the exhaust tube 14 at one or more fixed locations 168. By securing the elastic flap 161 to the exhaust tube 14 at the fixed location(s) 168, the elastic flap 161 may be pivoted about the pivot point 166 and deform against the exhaust tube 14 in a predictable or desirable fashion. For example, coupling the elastic flap 161 at the fixed location(s) 168 may reduce undesirable bunching of the elastic flap 161. More particularly, without fixing the elastic flap 161 at the fixed location(s) 168, the elastic flap 161 may not flip from defining an approximately concave surface 170 as shown in FIG. 4 to an approximately convex surface 172 as shown in FIG. 5. Without being secured to the exhaust tube 14 at the fixed location(s) 168, the elastic flap 161 may instead slide along the interior surface of the exhaust tube 14. For example, the elastic flap 161 may define a wavy or "W" shape when pivoted to the second position 161 rather than the convex surface 158. Further, without being secured to the exhaust tube 14, the ends of the elastic flap 161 may slide along the interior surface of the exhaust tube 14 and partially or fully block the outlet 148 of the aspiration tube 132. Further, it is contemplated that the elastic flap 161 may be sealed to the exhaust tube 153 between the pivot point 166 and the fixed location(s) 168 in order to prevent the exhaust gases 116 from flowing outside of the cross-sectional flow area 162.

Referring now to FIGS. 6 and 7, cross-sectional views of an additional or alternative embodiment of an aspiration zone of an exhaust tube and an associated airflow area modifier including multiple diaphragm members is illustrated in accordance with aspects of the present subject matter. Particularly, FIG. 6 illustrates the aspiration zone 126 with the diaphragm members 155 at first positions 157 such that a dimension of a cross-sectional flow area 162 is at a maximum first length 154. FIG. 7 illustrates the aspiration zone 126 with the diaphragm members 155 at second positions 159 such that the dimension of the cross-sectional flow area 162 is at a minimum second length 158. However, it should be appreciated that the aspects of aspiration zone 126 and airflow area modifier 150 may be utilized within any suitable aspiration system of a given work vehicle.

The aspiration zone 126 of FIGS. 6 and 7 may generally be configured the same as or similar to the aspiration zone 126 of FIG. 3. For instance, the orientation of the diaphragm members 155 may define the cross-sectional flow area 162 within the aspiration zone 126. However, rather than a single flap, the airflow area modifier 150 of FIGS. 6 and 7 may include the plurality of diaphragm members 155 defining the cross-sectional flow area 162. For example, the orientation of each diaphragm member 155 may be pivoted about respective pivot points 166, such as via an associated modifier actuator 152 for each diaphragm member 155, in order to adjust the size of the cross-sectional flow area 162. In one embodiment, the diaphragm member 155 may include metal segments. However, the diaphragm members 155 may be formed from any suitable material. Additionally, the diaphragm members 155 may generally extend from their respective pivot points 166 along the flow direction 118 within the aspiration zone 126 of the exhaust tube 14 (FIG. 3). For example, in one embodiment, each of the diaphragm members 155 may be configured as a flap, such as a flap the same or similar to the flap 153 or the elastic flap 161 as illustrated and described with reference to FIGS. 3-5, and extend along the flow direction 118 within the exhaust passage 124. As such, the cross-sectional flow area 162 of the aspiration zone 126 may be adjusted in order to adjust an aspiration level provided to the pre-cleaner 106 (FIG. 2) by the aspiration passage 138 and/or to adjust the backpressure within the exhaust tube 14.

As shown, the diaphragm members 155 may define the cross-sectional flow area 162 at a central location relative to the diaphragm members 155. Further, the diaphragm members 155 may be configured to at least partially overlap and slide relative to one another as the orientation of the diaphragm members 155 is adjusted. Further, contact between the diaphragm members 155 may generally seal or approximately seal the cross-sectional flow area 126 and define the exhaust passage 124. As such, the diaphragm members 155 may operate similar to a shutter for a camera lens in order to allow the diaphragm members 155 to slide relative to one another and adjust the cross-sectional flow area 162 defined therebetween. As further illustrated in FIGS. 6 and 7, a plurality of modifier actuators 152, such as a modifier actuator 152 for each of the diaphragm members 155, may be provided to pivot respective diaphragm members 155 about pivot points 166 to adjust the cross-sectional flow area 162 of the aspiration zone 126. For example, each diaphragm member 155 may be pivoted between the first position 157 and second position 159 and thereby decrease or increase, respectively, the cross-sectional flow area 162. Further, it should be appreciated that the modifier actuators 152 may be synchronized such that they pivot their respective diaphragm members 155 to the same or similar degrees.

When it is desired to reduce the static pressure of the exhaust gases 116 flowing through the aspiration zone 126, and thus increase the aspirated airflow 140 (FIG. 2), the modifier actuators 152 may be powered or otherwise activated to reduce the cross-sectional flow area 162. In such instance, the modifier actuators 152 may be powered or otherwise activated to pivot their respective diaphragm members 155 about the pivot points 166 in order to decrease the cross-sectional flow area 162. For example, the diaphragm members 155 may be pivoted from the first position 157, as shown in FIG. 6, to the second position 159 as shown in FIG. 7. Contrarily, when it is desired to reduce the backpressure within the exhaust tube 14, the modifier actuators 152 may be powered or otherwise activated to increase the cross-sectional flow area 162. In such instance, the modifier actuators 152 may be powered or otherwise activated to pivot their respective diaphragm members 155 about the pivot points 166 in order to increase the cross-sectional flow area 162. For example, the diaphragm members 155 may be pivoted from the second position 159 to the first position 157 such that the defined dimension is altered from the second length 158, as shown in FIG. 7, to the first length 154 as shown in FIG. 6.

It should be appreciated that FIGS. 3-7 provide examples of various different configurations of aspiration zones of exhaust tubes and associated airflow area modifiers. It should also be appreciated that, in alternative embodiments, the aspiration zone and airflow area modifier may have any other suitable configurations such that the cross-sectional flow area may be altered in order to change the static pressure of the exhaust gases flowing through the aspiration zone and thus adjust the aspirated airflow generated by such aspiration zone.

Referring now to FIG. 8, a schematic view of one embodiment of an aspiration system 100 for aspirating a component of a work vehicle is illustrated in accordance with aspects of the present subject matter. In general, aspiration system 100 will be described with reference to the work vehicle 10 and aspiration system 100 described with reference to FIGS. 1 and 2. Further, the system 100 will be described with reference to the embodiments of the aspiration zones 126 and airflow area modifiers 150 described above with reference to FIGS. 3-7. However, it should be appreciated by those of ordinary skill in the art that the disclosed system 100 may generally be utilized with work vehicles and/or aspiration zones and an associated airflow area modifier having any other suitable work vehicle, aspiration zone, or airflow area modifier configurations, respectively.

In several embodiments, the system 100 may include a controller 202 and various other components configured to be communicatively coupled to and/or controlled by the controller 202, such as one or more modifier actuators 152, a pressure sensor 164, and/or various components of the work vehicle 10, such as the engine 30. In general, the controller 202 may comprise any suitable processor-based device known in the art, such as a computing device or any suitable combination of computing devices. Thus, in several embodiments, the controller 202 may include one or more processor(s) 204 and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 206 of the controller 202 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 206 may generally be configured to store suitable computer-readable instructions that, when implemented by the processor(s) 204, configure the controller 202 to perform various computer-implemented functions, such as one or more aspects of the method 300 described below with reference to FIG. 9. In addition, the controller 202 may also include various other suitable components, such as a communications circuit or module, one or more input/output channels, a data/control bus and/or the like.

It should be appreciated that the controller 202 may correspond to an existing controller of the work vehicle 10 or the controller 202 may correspond to a separate processing device. For instance, in one embodiment, the controller 202 may form all or part of a separate plug-in module that may be installed within the work vehicle 10 to allow for the disclosed system and method to be implemented without requiring additional software to be uploaded onto existing control devices of the work vehicle 10.

In accordance with aspects of the present subject matter, the controller 202 may be configured to control the operation of an airflow area modifier 150 associated with an aspiration zone 126 of an exhaust tube 14 based on whether the cross-sectional flow area 162 of the exhaust tube 14 within the aspiration zone 126 should be decreased or increased. As described generally above, restricting the cross-sectional flow area 162 utilizing the airflow area modifier 150 may generally increase the velocity of exhaust gases 116 flowing through the aspiration zone 126 of the exhaust tube 14 and past an outlet 148 of an aspiration tube 132. As such, the static pressure of such flow through the aspiration zone 126 may be reduced in order to generate or increase an aspirated airflow 140 through the aspiration tube 132. For example, the aspirated airflow 140 may be maintained or increased in order to remove particulates from an associated air filtration system 102, such as a pre-cleaner 106 of the air filtration system 102. In another instance, as described above, expanding the cross-sectional flow area 162 utilizing the airflow area modifier 150 may generally decrease the velocity of the exhaust gases 116 through the aspiration zone 126 of the exhaust tube 14 and thus decrease or eliminate a backpressure of such exhaust gases 116 within the exhaust tube 14. However, it should be appreciated that decreasing the velocity of the exhaust gases 116 at the aspiration zone 126 may also increase the static pressure of the exhaust gases 116 through the aspiration zone 126, thereby decreasing the vacuum level and supply of aspirated airflow 140. As such, the controller 202 may be configured to maintain or increase the vacuum level of the aspirated airflow 140 while also balancing the need to decrease or maintain backpressure within the exhaust tube 14 to acceptable levels.

As shown in FIG. 8, the controller 202 may be communicatively coupled to one or more modifier actuators 152 provided in association with the airflow area modifier 150, via a wired or wireless connection, to allow control signals (e.g., indicated by dashed lines 210 in FIG. 6) to be transmitted from the controller 202 to the modifier actuators 152. As such, the controller 202 may be configured to transmit control signals 210 to the modifier actuator(s) 152 or associated components instructing the airflow area modifier 150 to decrease or increase the cross-sectional flow area 162 of the aspiration zone 126. For example, as described above with reference to FIGS. 3-5, the airflow area modifier 150 may include a flap 153 or elastic flap 161. In such instance, the modifier actuator 152 may be powered or otherwise activated to pivot the flap toward the second position 159 (reducing the cross-sectional flow area 162) or pivot the flap 153 toward the first position 157 (increasing the cross-sectional flow area 162 of the aspiration zone 126).

In another embodiment, such as the embodiment described above with reference to FIGS. 6 and 7, the airflow area modifier 150 may include a plurality diaphragm members 155 with a modifier actuator 152 provided in operative association with each diaphragm member 155. For instance, the cross-sectional flow area 162 of the aspiration zone 126 may be defined by the diaphragm members 155. In such instance, a modifier actuator 152 associated with each diaphragm member 155 may be powered or otherwise activated to pivot the associated diaphragm member 155 about a pivot point 166 between the first position 157 and the second position 159. For example, the modifier actuators 152 may be powered or otherwise activated to pivot the diaphragm members 155 toward the second position 159 (reducing the cross-sectional flow area 162) or pivot the diaphragm members 155 toward the first position 157 (increasing the cross-sectional flow area 162 of the aspiration zone 126).

In several embodiments, the controller 202 may be configured to monitor an operating parameter of the engine 30 and control the operation of the airflow area modifier 150 based on the monitored engine parameter. Specifically, as shown in FIG. 8, the controller 202 may be communicatively coupled to the engine 30 via wired or wireless connection to allow operating parameter data (e.g., indicated by dashed lines 208 in FIG. 8) to be transmitted from the engine 30 to the controller 202. For example, in one embodiment, the data 208 may be indicative of an RPM value for the engine 30 or a power output for the engine 30. Based on such engine parameter data 208, the controller 202 may then be configured determine a desirable cross-sectional flow area 162 for the aspiration zone 126. For instance, the controller 202 may include a look-up table or suitable mathematical formula stored within its memory 206 that correlates the data 208 indicative of the operating parameter of the engine 30 to the mass flow of the exhaust gases 116 flowing through the exhaust tube 14. Additionally or alternatively, the controller 202 may include a look-up table or suitable mathematical formula stored within its memory 206 that correlates the mass flow or engine parameter to a suitable cross-sectional flow area 162 of the aspiration zone 126 that may generate or maintain a low pressure zone or vacuum within the aspiration zone 126 such that the aspirated airflow 140 generated by such vacuum is sufficient to aspirate the pre-cleaner 106 to the degree required or desired. Further, as explained above, the controller 202 may be configured to power or otherwise actuate the modifier actuator(s) 152, or components, thereof to alter an orientation of the airflow area modifier 150, or components thereof, to adjust the cross-sectional flow area 162 based at least in part the monitored engine parameter and/or the determined cross-sectional flow area 162. For example, the controller 202 may be configured to maintain or approximately maintain a predetermined vacuum level or predetermine range of vacuum levels within the aspiration zone 126 by adjusting the cross-sectional flow area 162 based on the monitored engine parameter.

Furthermore, in several embodiments, the controller 202 may also be configured to maintain a backpressure of the exhaust gases 116 flowing through the exhaust tube 14 within an acceptable range. For instance, the controller 202 may further include a look-up table or suitable mathematical formula stored within its memory 206 that correlates the mass flow, engine parameter, and/or suitable cross-sectional flow area 162 of the aspiration zone 126 to the backpressure of the exhaust gases 116. As such, when the controller 202 identifies that the backpressure is outside of the acceptable range, such as over a predetermined threshold, the controller 202 may be configured to adjust the cross-sectional flow area 162 to reduce the backpressure. As explained above, the controller 202 may be configured to power or otherwise actuate the modifier actuator(s) 152 or components thereof to alter an orientation of the airflow area modifier 150, or components thereof, to adjust the cross-sectional flow area 162 based at least in part the monitored engine parameter, the determined cross-sectional flow area, and/or the backpressure. In one embodiment, it should be appreciated that the monitored engine parameter may include data 208 indicative of the backpressure within the exhaust tube 14 acting on the engine 30. As such, the controller 202 may be configured to adjust the cross-sectional flow area 162 based on such monitored backpressure to maintain the backpressure below the predetermined threshold.

Additionally, or alternatively, the controller 202 may be configured to monitor a vacuum level within the aspiration zone 126, the aspiration tube 132, and/or the pre-cleaner 106 and control the operation of the airflow area modifier 150 based on the monitored vacuum level. For example, a pressure sensor 164 positioned within the actuator line 160 or aspiration tube 132 may capture pressure data indicative of the vacuum level within the aspiration zone 126, the aspiration tube 132, and/or the pre-cleaner 106. Specifically, as shown in FIG. 8, the controller 202 may be communicatively coupled to the pressure sensor 164 via wired or wireless connection to allow pressure data (e.g., indicated by dashed lines 212 in FIG. 8) to be transmitted from the pressure sensor 164 to the controller 202. Based on such pressure data 212, the controller 202 may then be configured determine a vacuum level within the aspiration zone 126, the aspiration tube 132, and/or the pre-cleaner 106. For instance, the controller 202 may include a look-up table or suitable mathematical formula stored within its memory 206 that correlates the data 212 indicative of the fluid pressure within the actuator line 160 or aspiration tube 132 to the vacuum level within the aspiration zone 126, the aspiration tube 132, and/or the pre-cleaner 106.

Further, the controller 202 may be configured to maintain or approximately maintain a predetermined vacuum level or predetermine range of vacuum levels within the aspiration zone 126 by adjusting the cross-sectional flow area 162 based on the monitored pressure data 212. The predetermined level or predetermine range of vacuum levels may correspond to a vacuum level or range of vacuum levels suitable to provide a desired amount of aspirated airflow 140 while reducing the backpressure within the exhaust tube 14 to within acceptable levels. For example, the controller 202 may be configured to power or otherwise actuate the modifier actuator(s) 152, or components thereof, to alter an orientation of the airflow area modifier 150, or components thereof, to adjust the cross-sectional flow area 162 based at least in part the monitored pressure data 212 and/or the determined vacuum level within the aspiration zone 126, the aspiration tube 132, and/or the pre-cleaner 106. Thus, the controller 202 may be configured to maintain or approximately maintain the predetermined vacuum level or predetermine range of vacuum levels within the aspiration zone 126 based on the pressure data 212.

Figure 9:
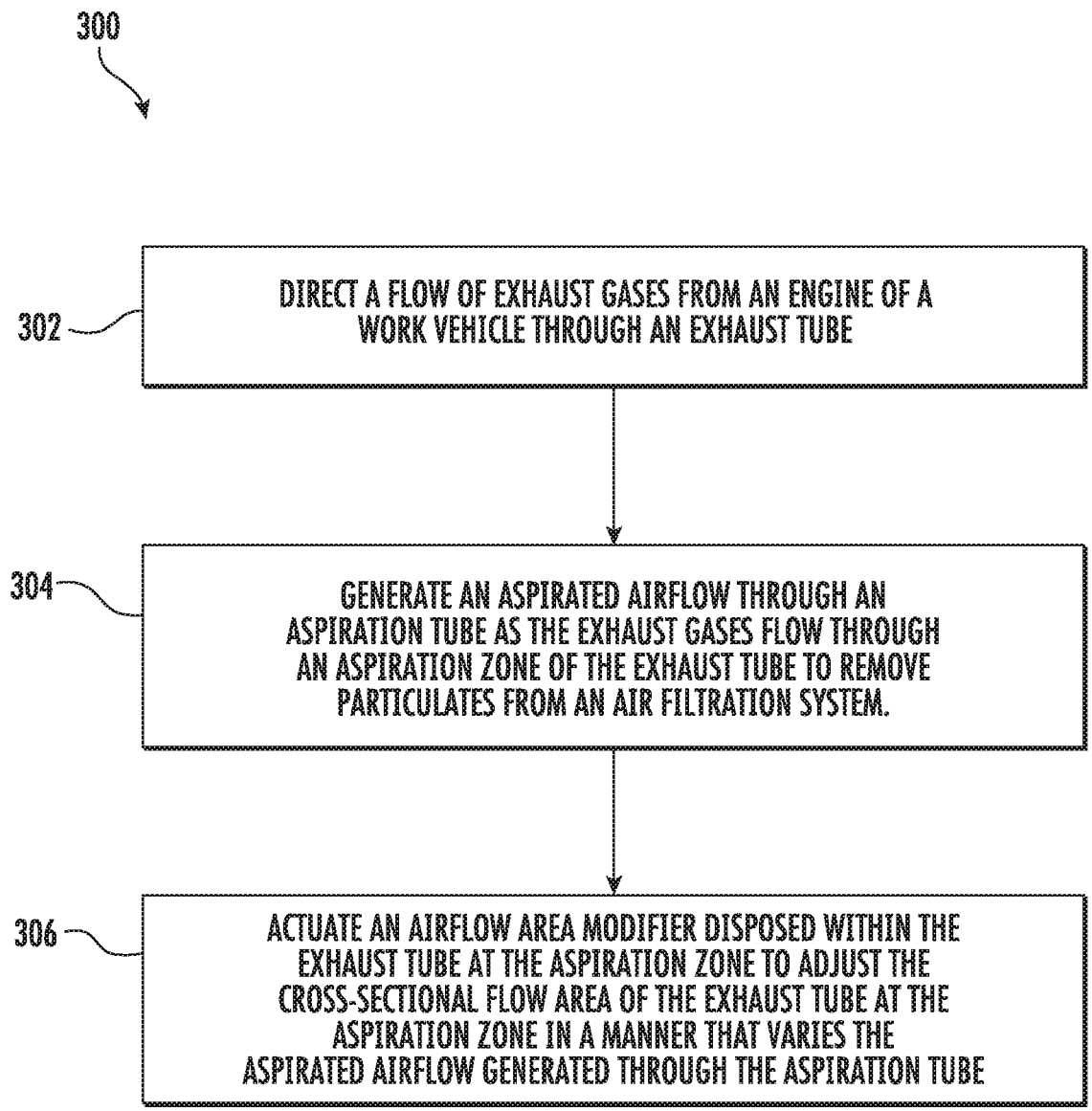
FIG. 9 is a flow diagram illustrating one embodiment of a method for aspirating an air filtration system of a work vehicle in accordance with aspects of the present subject matter.

Referring now to FIG. 9, a flow diagram of one embodiment of a method 300 for aspirating an air filtration system of a work vehicle is illustrated in accordance with aspects of the present subject matter. In general, the method 300 will be described herein with reference to the work vehicle 10, the aspiration system 100, and aspiration zones 126 described above with reference to FIGS. 1-8. However, it should be appreciated by those of ordinary skill in the art that the disclosed method 300 may generally be utilized in association with work vehicles, aspiration systems, and aspiration zones having any suitable configuration and/or as part of a system having any suitable system configuration. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

At (302), the method 300 may include directing a flow of exhaust gases from an engine of the work vehicle through the exhaust tube. For example, as described above, an exhaust tube 14 may be fluidly coupled to an engine 30 in order to receive a flow of exhaust gases 116 at an upstream end 120 of the exhaust tube 14. In general, the exhaust tube 14 may define an exhaust passage 124 extending from the upstream end 120 of the exhaust tube 14 to a downstream end 122 of the exhaust tube 14 through which the exhaust gases 116 may flow.

At (304), the method 300 may include generating an aspirated airflow through the aspiration tube as the exhaust gases flow through the aspiration zone to remove particulates from the air filtration system. For instance, as explained above, an aspiration zone 126 of the exhaust tube 14 may be fluidly coupled to an air filtration system 102 via an aspiration tube 132, such as by fluidly coupling the aspiration tube 132 to a pre-cleaner 106 of the air filtration system 102. Generally, the exhaust gases 116 flowing through the aspiration zone 126 may be accelerated and thus reduce the static pressure of the exhaust gases 116 at the aspiration zone 126. As such, a vacuum may be created at the aspiration zone 126 such that aspirated airflow 140 from the air filtration system 102 to the aspiration zone 126 is generated in order to remove particulates from the air filtration system 102, such as the pre-cleaner 106.

At (306), the method 300 may include actuating an airflow area modifier disposed within the exhaust tube at the aspiration zone to adjust the cross-sectional flow area of the exhaust tube at the aspiration zone in a manner that varies the aspirated airflow generated through the aspiration tube. For instance, one or more modifier actuators 152 may be powered or otherwise actuated in order to alter an orientation of an airflow area modifier 150 to adjust a cross-sectional flow area 162 of the exhaust tube 14 within the aspiration zone 126. For instance, a flap 153, elastic flap 161, or a plurality of diaphragm members 155 may be pivoted about respective pivot point 166 between first and second positions 157, 159 to alter the cross-sectional flow area 162 of the exhaust tube 14 within the aspiration zone 126. The airflow area modifier 150 may be used, for example, to narrow or throttle the aspiration zone 126, and thus reduce a cross-sectional flow area of the aspiration zone 126.

In one embodiment, actuating the airflow area modifier 150 may include automatically altering an orientation of the airflow area modifier 150 disposed within the exhaust tube 14 at the aspiration zone 126 in response to a change in pressure within an actuator line 160. In such an embodiment, as described above, the modifier actuator(s) 152 may correspond to a wastegate including a pressure actuator configured to activate a wastegate valve in response to a change in a negative pressure within the actuator line 160. Moreover, the actuator line 160 may be fluidly coupled between the aspiration tube 132 and the wastegate. Further, the wastegate valve may be operatively associated with the area flow modifier 150 such that the orientation of the area flow modifier 150 is altered as the wastegate value is activated.

In a further embodiment, the method 300 may include monitoring an operating parameter of an engine of a work vehicle. For instance, as described above, the controller 202 may be communicatively coupled to the engine 30 in order to receive data 208 indicative of an RPM value, power output, and/or backpressure acting on the engine 30. As such, the controller 202 may be configured to monitor the engine parameter based on the sensor data 208 received from the engine 30. In such an embodiment, actuating the airflow area modifier 150 may include activing the modifier actuator(s) 152 such that the cross-sectional flow area 162 of the exhaust tube 14 within the aspiration zone 126 is adjusted based at least in part on the monitored operating parameter of the engine 30.

For example, as described above, the controller 202 may be configured to transmit control signals 210 to the modifier actuator(s) 152 based on the monitored operating parameter of the engine 30. In one instance, the controller 202 may be configured to determine a desirable cross-sectional flow area 162 of the aspiration zone 126 to maintain a predetermined vacuum level based on the monitored engine parameter, such as the power output. Furthermore, the controller 202 may be configured to transmit control signals 210 to the modifier actuator(s) 152 to alter the orientation of the airflow area modifier 150 and thus adjust the cross-sectional flow area 162 of the aspiration zone 126 such that a flow velocity of exhaust gases 116 flowing through the aspiration zone 126 is altered to maintain the predetermined vacuum level within the aspiration zone 126. Additionally, or alternatively, the controller 202 may be configured to determine a minimum cross-sectional flow area 162 of the aspiration zone 126 such that a backpressure of the exhaust gases 116 within the exhaust tube 14 are maintained below a predetermined threshold value based on the monitored engine parameter, such as a monitored backpressure, or determined or calculated backpressure. Furthermore, the controller 202 may be configured to transmit control signals 210 to the modifier actuator(s) 152 to adjust the cross-sectional flow area 162 of the aspiration zone 126 such that the backpressure of the exhaust gases 116 within the exhaust tube 14 are maintained below the predetermined threshold value.

In a still further embodiment, method 300 may include monitoring a vacuum level within the exhaust tube 14 at the aspiration zone 126 based on pressure data received from a pressure sensor 164 provided in operative association with the aspiration tube 132. For instance, as described above, the pressure sensor 164 may be positioned within the aspiration tube 164, within the actuator line 160, or within a separate line in fluid communication with the aspiration tube 126. Further, the controller 202 may be communicatively coupled to the pressure sensor 164 in order to receive pressure data 212 indicative of the vacuum level within the aspiration zone 126. As such, the controller 202 may be configured to monitor the vacuum level within the aspiration zone 126 based on the sensor data 212 received from the pressure sensor 164. In such an embodiment, actuating the modifier actuator(s) 152 may include altering an orientation of the airflow area modifier 150 such that the cross-sectional flow area 162 of the exhaust tube 14 within the aspiration zone 126 is adjusted based at least in part on the monitored vacuum level. For example, as described above, the controller 202 may be configured to transmit control signals 210 to the modifier actuator(s) 152 based on the monitored vacuum level. The controller 202 may be configured to power or otherwise actuate the modifier actuator(s) 152 or components thereof to alter an orientation of the airflow area modifier 150, or components thereof, to adjust the cross-sectional flow area 162 based at least in part the pressure data 212 and/or the determined vacuum level within the aspiration zone 126. Thus, the controller 202 may be configured to maintain or approximately maintain the predetermined vacuum level or predetermine range of vacuum levels within the aspiration zone 126.

It is to be understood that the steps of the method 300 are performed by the controller 202 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 202 described herein, such as the method 300, is implemented in software code or instructions which are tangibly stored on a tangible computer readable medium. The controller 202 loads the software code or instructions via a direct interface with the computer readable medium or via a wired and/or wireless network. Upon loading and executing such software code or instructions by the controller 202, the controller 202 may perform any of the functionality of the controller 202 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An aspiration system for a work vehicle, the aspiration system comprising:
    an exhaust tube extending along a flow direction from an upstream end to a downstream end, the exhaust tube defining an exhaust passage extending from the upstream end of the exhaust tube to the downstream end of the exhaust tube;
    an aspiration tube in flow communication with the exhaust tube at an aspiration zone of the exhaust tube, the aspiration tube configured to receive an aspirated airflow;
    an airflow area modifier provided in operative association with the aspiration zone of the exhaust tube, the airflow area modifier being actuatable to adjust a cross-sectional flow area of the exhaust tube within the aspiration zone;
    an actuator provided in operative association with the airflow area modifier such that the actuator is configured to alter an orientation of the airflow area modifier such that the cross-sectional flow area of the exhaust tube within the aspiration zone is adjusted;
    a controller configured to control an operation of the actuator to adjust the cross-sectional flow area of the exhaust tube at the aspiration zone; and
    a pressure sensor provided in operative association with the aspiration tube and configured to capture pressure data indicative of a vacuum level within the aspiration zone, wherein the controller is further configured to monitor the pressure data captured by the pressure sensor and control the operation of the actuator to adjust the cross-sectional flow area of the exhaust tube at the aspiration zone based on the monitored pressure data.

2. The aspiration system of claim 1, wherein a static pressure of an exhaust gas flowing through the exhaust tube at the aspiration zone of the exhaust tube is also adjusted when the orientation of the airflow area modifier is altered.

3. The aspiration system of claim 1, wherein the aspiration tube is configured to receive the aspirated airflow from an air filtration system of the work vehicle, the aspiration tube defining an aspiration passage extending between the air filtration system and the aspiration zone of the exhaust tube.

4. The aspiration system of claim 1, further comprising:
    an actuator line in flow communication with the aspiration tube and the actuator, wherein the actuator is configured such that a change in pressure within the actuator line automatically alters the orientation of the airflow area modifier.

5. The aspiration system of claim 1, wherein the airflow area modifier comprises a flap pivotably coupled to the exhaust tube, wherein the flap is configured to be pivoted about a pivot point to alter a distance between the flap and an outlet of the aspiration tube when the orientation of the airflow area modifier is altered.

6. The aspiration system of claim 5, wherein the flap comprises an elastic flap configured to deform to accommodate a cross-sectional shape of the aspiration zone of the exhaust tube when the orientation of the airflow area modifier is altered.

7. The aspiration system of claim 5, wherein the flap defines an arcuate shape such that the cross-sectional flow area of the exhaust tube is varied along the length of the arcuate shape of the flap in the flow direction.

8. The aspiration system of claim 1, wherein the airflow area modifier comprises a plurality of diaphragm members defining the cross-sectional flow area at a central location relative to the plurality of diaphragm members, each diaphragm member of the plurality of diaphragm members being pivotably coupled to the exhaust tube, and wherein an actuator is provided in operative association with each diaphragm member of the plurality of diaphragm members, the plurality of diaphragm members configured to at least partially overlap and slide relative to one another as the cross-sectional flow area of the exhaust tube within the aspiration zone is adjusted.

9. A work vehicle, comprising:
an engine;
an air filtration system configured to filter air provided to the engine;
an exhaust tube extending along a flow direction from an upstream end to a downstream end, the exhaust tube defining an exhaust passage extending from the upstream end of the exhaust tube to the downstream end of the exhaust tube;
an aspiration tube fluidly coupled between the air filtration system and an aspiration zone of the exhaust tube, the aspiration tube defining an aspiration passage extending between the air filtration system and the exhaust tube;
an airflow area modifier provided in operative association with the aspiration zone of the exhaust tube, the airflow area modifier being actuatable to adjust a cross-sectional flow area of the exhaust tube within the aspiration zone;
an actuator provided in operative association with the airflow area modifier such that the actuator is configured to alter an orientation of the airflow area modifier such that the cross-sectional flow area of the exhaust tube within the aspiration zone is adjusted;
a controller configured to control an operation of the actuator to adjust the cross-sectional flow area of the exhaust tube within the aspiration zone; and
a pressure sensor provided in operative association with the aspiration tube and configured to capture pressure data indicative of a vacuum level within the aspiration zone, wherein the controller is further configured to monitor the pressure data captured by the pressure sensor and control the operation of the actuator to adjust the cross-sectional flow area of the exhaust tube within the aspiration zone based on the monitored pressure data.

10. The work vehicle of claim 9, wherein the controller is further configured to monitor an operating parameter of the engine and control the operation of the actuator to adjust the cross-sectional flow area of the exhaust tube within the aspiration zone based on the monitored operating parameter of the engine.

11. The work vehicle of claim 9, further comprising:
an actuator line in flow communication with the aspiration tube and the actuator, wherein the actuator is configured such that a change in pressure within the actuator line automatically alters the orientation of the airflow area modifier.

12. The work vehicle of claim 9, wherein the airflow area modifier comprises a flap, the flap pivotably coupled to the exhaust tube, wherein the flap is configured to be pivoted about a pivot point to alter a distance between the flap and an outlet of the aspiration tube when the orientation of the airflow area modifier is altered.

13. A method of aspirating an air filtration system of a work vehicle, the air filtration system including an aspiration tube in fluid communication with an exhaust tube of the work vehicle at an aspiration zone of the exhaust tube, the method comprising:
directing a flow of exhaust gases from an engine of the work vehicle through the exhaust tube;
generating an aspirated airflow through the aspiration tube as the exhaust gases flow through the aspiration zone to remove particulates from the air filtration system, the exhaust tube defining a cross-sectional flow area at the aspiration zone;
actuating an airflow area modifier disposed within the exhaust tube at the aspiration zone to adjust the cross-sectional flow area of the exhaust tube at the aspiration zone in a manner that varies the aspirated airflow generated through the aspiration tube;
monitoring, with a computing device, a vacuum level within the exhaust tube at the aspiration zone based on pressure data received from a pressure sensor provided in operative association with the aspiration tube, and
wherein actuating the airflow area modifier comprises actuating, with the computing device, the airflow area modifier disposed within the exhaust tube at the aspiration zone such that the cross-sectional flow area of the exhaust tube at the aspiration zone is adjusted based at least in part on the monitored vacuum level within the exhaust tube at the aspiration zone.

14. The method of claim 13, wherein actuating the airflow area modifier comprises automatically altering an orientation of the airflow area modifier disposed within exhaust tube at the aspiration zone in response to a change in pressure within an actuator line in flow communication with the aspiration tube and the actuator.

15. The method of claim 13, further comprising:
monitoring, with a computing device, an operating parameter of an engine of the work vehicle, and
wherein actuating the airflow area modifier comprises actuating, with the computing device, the airflow area modifier disposed within the exhaust tube at the aspiration zone such that the cross-sectional flow area of the exhaust tube at the aspiration zone is adjusted based at least in part on the monitored operating parameter of the engine.

16. An aspiration system for a work vehicle, the aspiration system comprising:
an exhaust tube extending along a flow direction from an upstream end to a downstream end, the exhaust tube defining an exhaust passage extending from the upstream end of the exhaust tube to the downstream end of the exhaust tube;

an aspiration tube in flow communication with the exhaust tube at an aspiration zone of the exhaust tube, the aspiration tube configured to receive an aspirated airflow;

an airflow area modifier provided in operative association with the aspiration zone of the exhaust tube, the airflow area modifier being actuatable to adjust a cross-sectional flow area of the exhaust tube within the aspiration zone; and an actuator provided in operative association with the airflow area modifier such that the actuator is configured to alter an orientation of the airflow area modifier such that the cross-sectional flow area of the exhaust tube within the aspiration zone is adjusted, wherein the airflow area modifier comprises a plurality of diaphragm members defining the cross-sectional flow area at a central location relative to the plurality of diaphragm members, each diaphragm member of the plurality of diaphragm members being pivotably coupled to the exhaust tube, and wherein an actuator is provided in operative association with each diaphragm member of the plurality of diaphragm members, the plurality of diaphragm members configured to at least partially overlap and slide relative to one another as the cross-sectional flow area of the exhaust tube within the aspiration zone is adjusted.

* * * * *